United States Patent [19]

Oguchi et al.

[11] Patent Number: 4,944,981

[45] Date of Patent: Jul. 31, 1990

[54] OPTICAL RECORDING MEDIUM

[75] Inventors: Yoshihiro Oguchi, Yokohama; Tsuyoshi Santoh, Kawasaki, both of Japan

[73] Assignee: Canon Kabushiki Kaisha, Tokyo, Japan

[21] Appl. No.: 336,515

[22] Filed: Apr. 11, 1989

Related U.S. Application Data

[63] Continuation of Ser. No. 159,350, Feb. 23, 1988, abandoned.

[30] Foreign Application Priority Data

Feb. 25, 1987 [JP] Japan .................................. 62-40416
Feb. 25, 1987 [JP] Japan .................................. 62-40417
Feb. 25, 1987 [JP] Japan .................................. 62-40418

[51] Int. Cl.$^5$ ............................................... B32B 3/00
[52] U.S. Cl. ............................................... 428/64; 428/65;
428/209; 428/411.1; 428/412; 428/457;
428/913; 428/220; 428/333; 430/945; 346/766;
346/135.1; 369/288

[58] Field of Search .................. 428/64, 65, 913, 209,
428/411.1, 412, 457, 220, 333, 334, 335; 346/76
L, 135.1; 369/288; 430/945

[56] References Cited

U.S. PATENT DOCUMENTS 4,738,909 4/1988 Oguchi et al. .................. 430/20

FOREIGN PATENT DOCUMENTS 61162385 9/1988 Japan .

OTHER PUBLICATIONS

CA108(4):29576b, Kanne et al., Jul. 21, 1987.
CA106(22):186587g, Sato, Jul. 23, 1986.

Primary Examiner—Patrick Ryan
Attorney, Agent, or Firm—Fitzpatrick, Cella, Harper & Scinto

[57] ABSTRACT

An optical recording medium comprises an organic film, wherein said organic film contains at least one compound selected from the compounds represented by Formulas (I), (II) and (III).

3 Claims, 1 Drawing Sheet

OPTICAL RECORDING MEDIUM

This application is a continuation of application Ser. No. 159,350 filed Feb. 23, 1988, now abandoned.

BACKGROUND OF THE INVENTION

1. Field of the Invention

The present invention relates to an optical recording medium for optically recording and reproducing information.

2. Related Background Art

In general, optical recording mediums, for example, optical discs and optical cards can record information in a high density by forming optically detectable pits of minute size, for example, of about 1 μm on a thin recording layer provided on a substrate having grooves of spiral, circular or linear form.

To write information in such an optical recording medium, a focused laser beam is scanned on the surface of a laser beam sensitive layer, whereby pits are formed only on the surface on which the laser beam was irradiated and the information is recorded The laser-beam-sensitive layer can absorb energy to form optically detectable pits thereon. For example, in a certain heat mode recording system, the laser-beam-sensitive layer absorbs a heat energy to form minute concaves. i.e., pits, on those energy-absorbed parts by evaporation or fusion. In another heat mode system, the absorption of the energy of the irradiated laser beam can form pits having an optically detectable density difference on those parts.

The information recorded on the optical recording medium in this manner can be detected by reading optical changes between the part on which the pits are formed and that part on which the pits are not formed.

Hitherto known laser beam-sensitive layers or recording layers used in such optical recording mediums include those in which inorganic materials are chiefly used, for example, those in which bismuth thin films, tellurium oxide thin films, chalcogenite type amorphous glass films or metal thin films such as aluminum or gold thin films are used as disclosed in Japanese Patent Publication No. 40479/1871, Japanese Patent Laid-open No. 27395/1981, etc. These thin films, however, have been disadvantageous such that they involve poor storage stability, low resolution power, low recording density, high production cost, etc.

Recently, also proposed in Japanese Patent Laid-open No. 187948/1985, Japanese Patent Laid-open No. 205841/1988, etc. is to use in the recording layer an organic coloring matter thin film whose physical properties can be changed by light of a relatively long wavelength, for example, of 780 nm or more. In this organic coloring matter thin film, the pits can be formed by use of a semiconductor laser beam having an oscillation wavelength, for example, of around 830 nm, thus eliminating the drawbacks possessed by the above mentioned thin films chiefly employing the inorganic materials. In general, however, organic coloring matters having absorption characteristics on the side of the long wavelength has the problem such that they have a low stability to heat and light.

An organic coloring matter that can solve the above problem is disclosed in Japanese Patent Laid-open No. 181690/1983. In the invention disclosed therein, the organic coloring matter has a great absorption band to a wavelength (750 to 850 nm) of conventional semiconductor lasers. Recent years, however, a semiconductor laser that can oscillate light of a shorter wavelength, for example, of a visible light region has been developed. Thus, an organic coloring matter having a great absorption band even to the light from such a semiconductor laser has been sought after.

SUMMARY OF THE INVENTION

An object of the present invention is to provide an optical recording medium having an organic thin layer that has a greater absorption band not only to light from conventional semiconductor laser but also to light of a shorter wavelength, for example, near 680 nm, and also can be stable to heat and light, may suffer less light deterioration and reproduction deterioration, and has excellent storage stability.

According to the present invention, there is provided with an optical recording medium comprising an organic film, wherein said organic film contains at represented by Formulas (I), (II) and (III) shown below.

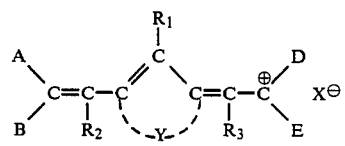

Formula (I)

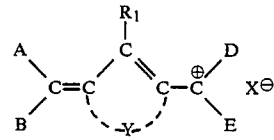

Formula (II)

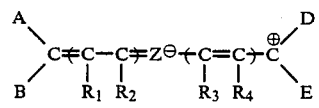

Formula (III)

wherein A, B, D and E each represent a hydrogen atom, a substituted or unsubstituted alkyl group, a cyclic alkyl group, an alkenyl group, a substituted or unsubstituted aralkyl group, a substituted or unsubstituted aryl group, a substituted or unsubstituted styryl group, or a substituted or unsubstituted heterocyclic group; Y represents a divalent residual group having a group of atoms necessary for completing a ring of 5 or 6 members; $R_1$, $R_2$, $R_3$ and $R_4$ each represent a hydrogen atom, a halogen atom, or an alkyl group; m and n each represents an integer of 0, 1 or 2; $Z^{\ominus}$ represents

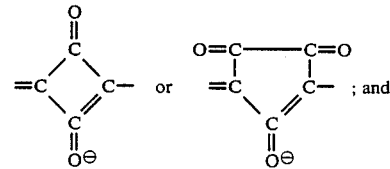

$X^{\ominus}$ represents an anion.

In the present invention, since the compound has less number of carbon atoms in the main chain by two or more as compared with the one disclosed in Japanese patent Laid-open No. 181690/1983, the position of the absorption peak is shifted by about 50 nm or more to the short wavelength side. For this reason, it is possible to obtain an optical recording medium improved in the sensitivity to near infrared light from conventional semiconductor lasers or the like, and at the same time improved also in the sensitivity to light from a short wavelength semiconductor laser, for example, light of visible light region near 680 nm.

DETAILED DESCRIPTION OF THE INVENTION

Figure 1:
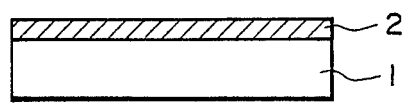
FIG. 1 to FIG. 4 are views schematically illustrating examples of the optical recording mediums according to the present invention.

In the compounds represented by the above Formulas (I), (II) and (III) used in the present invention, A, B, D and E each represent a hydrogen atom or an alkyl group (for example, a methyl group, an ethyl group, a n propyl group, an iso-propyl group, a n-butyl group, a sec-butyl group, an iso-butyl group, a t-butyl group, a n-amyl group, a t-amyl group, a n-hexyl group, a n-octyl group, t-octylgroup, etc.), including other alkyl groups, for example, substituted alkyl groups (for example, a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a 3-sulfatopropyl group, a 4-sulfatobutyl group, a N-(methylsulfonyl)-carbamylmethyl group, a 3-(acetylsulfamyl) propyl group, a 4-(acetylsulfamyl) butyl group, etc.), cyclic alkyl groups (for example, a cyclohexyl group), alkenyl groups (for example, a vinyl group, an allyl group, a propenyl group, a butenyl group, a pentenyl group, a hexenyl group, a heptenyl group, an octenyl group, a dodecenyl group, a prenyl group, etc.), aralkyl groups (for example, a benzyl group, a phenethyl group, an α-naphthylmethyl group, a β-naphthylmethyl group, etc.), substituted aralkyl groups (for example, a o carboxybenzyl group, a sulfobenzyl group, a hydroxybenzyl group, etc.), etc.

A, B, D and E each further represent a substituted or unsubstituted aryl group (for example, a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group, etc.), a substituted or unsubstituted heterocyclic group (for example, a pyridyl group, a quinolyl group, a lepidyl group, a methylpyridyl, a furyl group, a thienyl group, an indolyl group, a pyrrole group, a carbazolyl group, an N-ethylcarbazolyl group, etc.) or a substituted or unsubstituted styryl group (for example, a styryl group, a methoxystyryl group, a dimethoxystyryl group, a trimethoxystyryl group, an ethoxystyryl group, a dimethylaminostyryl group, a diethylaminostyryl group, a dipropylaminostyryl group , a dibenzylaminostyryl group, a diphenylaminostyryl group, a 2,2-diphenylvinyl group, a 2-phenyl-2-methylvinyl group, a 2-(dimethylaminophenyl)-2-phenylvinyl group, a 2-(diethylaminophenyl)-2-phenylvinyl group, a 2-(dibenzylaminophenyl)-2-phenylvinyl group, a 2,2-di(diethylaminophenyl)vinyl group, a 2,2-di(methoxyphenyl)vinyl group, a 2,2-di(ethoxyphenyl) vinyl group, a 2-(dimethylaminophenyl)-2-methylvinyl group, a 2-(diethylaminophenyl)-2-ethylvinyl group, etc.).

$R_1$, $R_2$, $R_3$ and $R_4$ each represent a hydrogen atom, a halogen atom (such as a chlorine atom and a bromine atom) or an alkyl group (such as a methyl group, an ethyl group, a propyl group, a butyl group and an amyl group).

Y represents a divalent hydrocarbon group (such as $-CH_2-CH_2-$, $-CH_2-CH_2-CH_2-$,

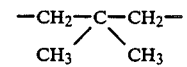

and $-CH=CH-$) that forms a substituted or unsubstituted 5-membered or 6-membered ring, and the 5-membered or 6-membered ring may be condensed with a benzene ring, a naphthalene ring or the like.

$X^\ominus$ represents an anion including, for example, a chloride ion, a bromide ion, an iodide ion, a perchlorate ion, a benzenesulfonate ion, a p-toluenesulfonate ion, a methylsulfate ion, an ethylsulfate ion, a propylsulfate ion, etc.

Typical examples of the polymethine compounds represented respectively by the above Formulas (I), (II) and (III) are shown below, but, in the present invention by no means limited to these.

| Compound No. | Formula | B | A | D | E | R₁ | R₂ | R₃ | ring | X |
|---|---|---|---|---|---|---|---|---|---|---|
| (1) | (I) | C₆H₅– | C₆H₅– | C₆H₅– | C₆H₅– | H | H | H | cyclohexene | Cl |
| (2) | (I) | H | C₆H₅– | C₆H₅– | H | CH₃ | CH₃ | CH₃ | cyclopentene | Br |
| (3) | (I) | (CH₃)₂N–C₆H₄– | (CH₃)₂N–C₆H₄– | (CH₃)₂N–C₆H₄– | (CH₃)₂N–C₆H₄– | Cl | CH₃ | H | cyclohexene | ClO₄ |
| (4) | (I) | (CH₃)₂N–C₆H₄– | (CH₃)₂N–C₆H₄– | (CH₃)₂N–C₆H₄– | (CH₃)₂N–C₆H₄– | Cl | H | H | cyclohexene | ClO₄ |
| (5) | (I) | (CH₃)₂N–C₆H₄– | (CH₃)₂N–C₆H₄– | (CH₃)₂N–C₆H₄– | (CH₃)₂N–C₆H₄– | Cl | CH₃ | CH₃ | 1-methylcyclohexene (H₃C–C(CH₃)) | I |
| (6) | (I) | C₆H₅– | (CH₃)₂N–C₆H₄– | (CH₃)₂N–C₆H₄– | C₆H₅– | H | H | H | indene | BF₄ |
| (7) | (I) | CH₃–C₆H₄– | CH₃–C₆H₄– | (CH₃)₂N–C₆H₄– | CH₃–C₆H₄– | Cl | C₂H₅ | C₂H₅ | cyclohexene | CH₃–C₆H₄–SO₃ |
| (8) | (I) | C₂H₅O–C₆H₄– | C₂H₅O–C₆H₄– | (CH₃)₂N–C₆H₄– | C₂H₅O–C₆H₄– | H | H | H | cyclopentene | ClO₄ |

| Compound No. | Formula | B | A | D | E | R₁ | R₂ | R₃ | ring | X |
|---|---|---|---|---|---|---|---|---|---|---|
| (9) | (I) | (CH₃)₂N–C₆H₄– | Cl–C₆H₄– | (CH₃)₂N–C₆H₄– | Cl–C₆H₄– | H | Cl | Cl | 1-methylcyclohexene (H₃C–C(CH₃)) | ClO₄ |

-continued

| | | | | | | | |
|---|---|---|---|---|---|---|---|
| (10) | 4-N(C$_2$H$_5$)$_2$-C$_6$H$_4$ | 4-N(C$_2$H$_5$)$_2$-C$_6$H$_4$ | 4-N(C$_2$H$_5$)$_2$-C$_6$H$_4$ | H | H | 1,1-dimethylcyclohex-3-enyl | ClO$_4$ |
| (11) | 4-N(C$_2$H$_5$)$_2$-C$_6$H$_4$ | 4-N(C$_2$H$_5$)$_2$-C$_6$H$_4$ | 4-N(C$_2$H$_5$)$_2$-C$_6$H$_4$ | Cl | H | cyclohexenyl | ClO$_4$ |
| (12) | 4-N(C$_2$H$_5$)$_2$-C$_6$H$_4$ | 4-N(C$_2$H$_5$)$_2$-C$_6$H$_4$ | H | CH$_3$ | H | cyclopentenyl | I |
| (13) | 4-N(C$_2$H$_5$)$_2$-C$_6$H$_4$ | 4-N(C$_2$H$_5$)$_2$-C$_6$H$_4$ | C$_6$H$_5$ | Cl | Cl | indenyl | BF$_3$ |
| (14) | 4-N(C$_2$H$_5$)$_2$-C$_6$H$_4$ | 4-N(C$_2$H$_5$)$_2$-C$_6$H$_4$ | 4-C$_2$H$_5$-C$_6$H$_4$ | H | H | cyclohexenyl | ClO$_4$ |
| (15) | 4-N(C$_2$H$_5$)$_2$-C$_6$H$_4$ | 4-N(C$_2$H$_5$)$_2$-C$_6$H$_4$ | 3-CH$_3$-4-CH$_3$-C$_6$H$_3$ | Br | Br | cyclopentenyl | H$_3$C-C$_6$H$_4$-SO$_3$ |
| (16) | 4-N(C$_2$H$_5$)$_2$-C$_6$H$_4$ | 4-N(C$_2$H$_5$)$_2$-C$_6$H$_4$ | 4-OC$_2$H$_5$-C$_6$H$_4$ | H | H | cyclohexenyl | ClO$_4$ |
| (17) | 4-N(C$_2$H$_5$)$_2$-C$_6$H$_4$ | 4-N(C$_2$H$_5$)$_2$-C$_6$H$_4$ | 3-OCH$_3$-4-OCH$_3$-C$_6$H$_3$ | Cl | H | 1,1-dimethylcyclohex-3-enyl | I |
| (18) | 4-N(C$_2$H$_5$)$_2$-C$_6$H$_4$ | 4-N(C$_2$H$_5$)$_2$-C$_6$H$_4$ | 6-methylpyridin-2-yl | Br | CH$_3$ CH$_3$ | cyclopentenyl | CH$_3$-C$_6$H$_4$-SO$_3$ |
| (19) | 4-N(C$_2$H$_5$)$_2$-C$_6$H$_4$ | 4-N(C$_2$H$_5$)$_2$-C$_6$H$_4$ | —CH$_3$ | H | H | indenyl | BF$_4$ |
| (20) | 4-N(C$_2$H$_5$)$_2$-C$_6$H$_4$ | 4-N(C$_2$H$_5$)$_2$-C$_6$H$_4$ | 4-Cl-C$_6$H$_4$ | Cl | H | cyclopentenyl | ClO$_4$ |

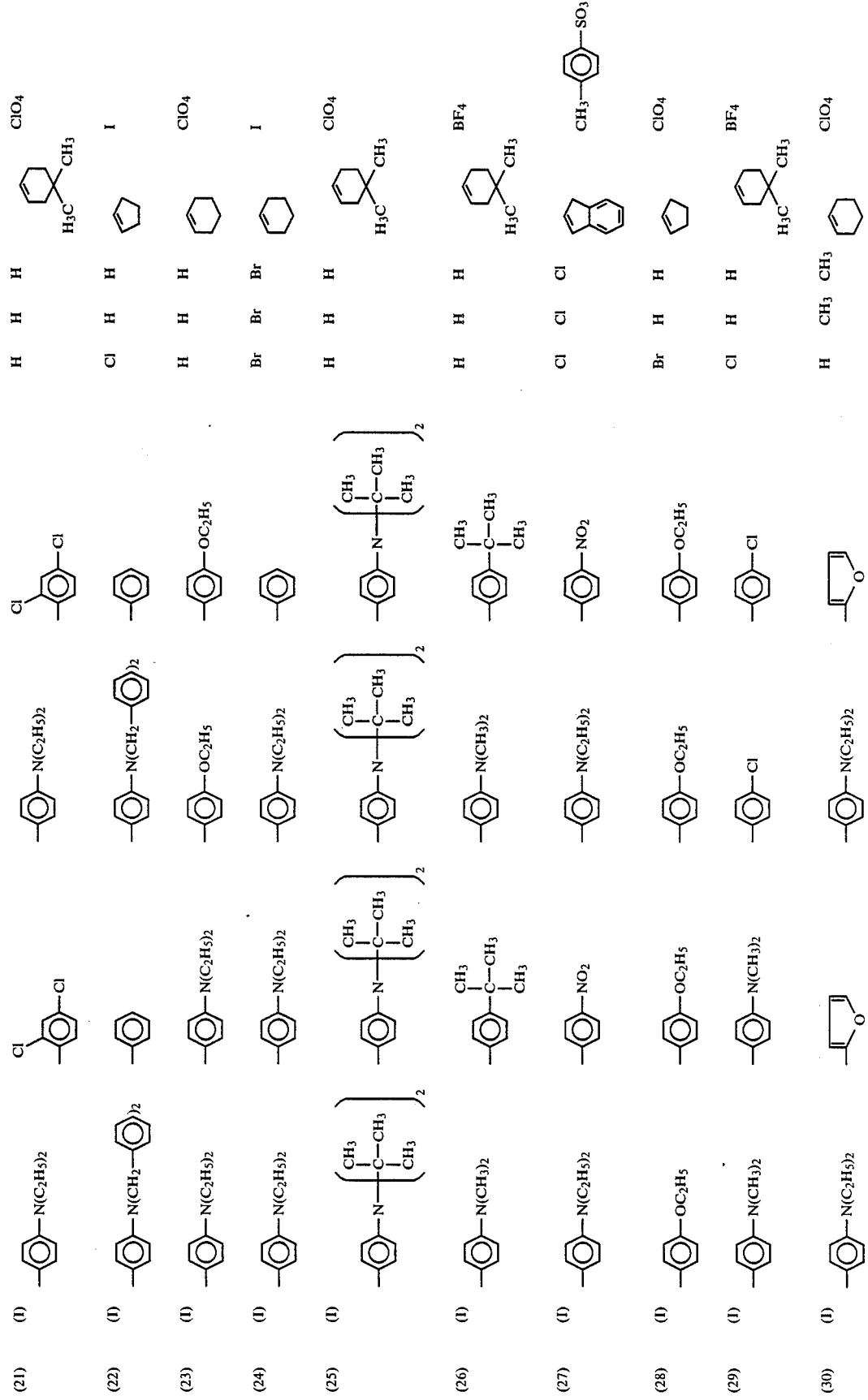

-continued

| | | | | | | | |
|---|---|---|---|---|---|---|---|
| (31) | (I) | ⌬-N(C₂H₅)₂ | ⌬(furan-O) | ⌬-N(C₂H₅)₂ | ⌬(furan-O) | H | H | ClO₄ |
| (32) | (I) | ⌬-N(CH₃)₂ | ⌬-N(CH₃)₂ | ⌬-Cl | ⌬-Cl | H | cyclohexa-1,3-diene with C(CH₃)₂ | ClO₄ |
| (33) | (II) | ⌬-N(CH₃)₂ | ⌬(phenyl) | ⌬-Cl | H | Cl | cyclohexenyl | Cl |
| (34) | (II) | ⌬-N(CH₃)₂ | ⌬(phenyl) | ⌬(phenyl) | H | H | cyclohexenyl | Br |
| (35) | (II) | ⌬-N(CH₃)₂ | ⌬-N(CH₃)₂ | ⌬-N(CH₃)₂ | H | Cl | cyclopentenyl | ClO₄ |
| (36) | (II) | ⌬-N(CH₃)₂ | ⌬-N(CH₃)₂ | ⌬-N(CH₃)₂ | H | H | cyclohexenyl | ClO₄ |
| (37) | (II) | ⌬-N(CH₃)₂ | ⌬-N(CH₃)₂ | ⌬-N(CH₃)₂ | H | H | cyclohexa-1,3-diene with C(CH₃)₂ | ClO₄ |
| (38) | (II) | ⌬-N(CH₃)₂ | ⌬(phenyl) | ⌬(phenyl) | H | Cl | indenyl | I |
| (39) | (II) | ⌬-N(CH₃)₂ | ⌬-CH₃ | ⌬-CH₃ | H | CH₃ | cyclohexenyl | BF₄ |
| (40) | (II) | ⌬-N(CH₃)₂ | ⌬-OC₂H₅ | ⌬-OC₂H₅ | H | Cl | cyclopentenyl | CH₃-⌬-SO₃ |
| (41) | (II) | ⌬-N(CH₃)₂ | ⌬-Cl | ⌬-Cl | H | H | cyclohexenyl | ClO₄ |
| (42) | (II) | ⌬-N(C₂H₅)₂ | ⌬-N(C₂H₅)₂ | ⌬-N(C₂H₅)₂ | H | H | cyclohexa-1,3-diene with C(CH₃)₂ | ClO₄ |

-continued

| | | | | | | |
|---|---|---|---|---|---|---|
| (43) | (II) | ⌬-N(C₂H₅)₂ | ⌬-N(C₂H₅)₂ | ⌬-N(C₂H₅)₂ | Cl | cyclohexene | ClO₄ |
| (44) | (II) | ⌬-N(C₂H₅)₂ | ⌬-N(C₂H₅)₂ | H | Br | cyclopentene | I |
| (45) | (II) | ⌬-N(C₂H₅)₂ | ⌬-N(C₂H₅)₂ | ⌬ | Cl | indene | BF₃ |
| (46) | (II) | ⌬-N(C₂H₅)₂ | ⌬-N(C₂H₅)₂ | ⌬-C₂H₅ | H | cyclohexene | ClO₄ |
| (47) | (II) | ⌬-N(C₂H₅)₂ | ⌬-N(C₂H₅)₂ | 2,4-(CH₃)₂-⌬ | Br | cyclopentene | H₃C-⌬-SO₃ |
| (48) | (II) | ⌬-N(C₂H₅)₂ | ⌬-N(C₂H₅)₂ | ⌬-OC₂H₅ | H | (CH₃)₂-cyclohexene | ClO₄ |
| (49) | (II) | ⌬-N(C₂H₅)₂ | ⌬-N(C₂H₅)₂ | 2,4-(OCH₃)₂-⌬ | Cl | cyclohexene | I |
| (50) | (II) | ⌬-N(C₂H₅)₂ | ⌬-N(C₂H₅)₂ | pyridinyl | Br | cyclopentene | CH₃-⌬-SO₃ |
| (51) | (II) | ⌬-N(C₂H₅)₂ | ⌬-N(C₂H₅)₂ | —CH₃ | H | indene | BF₄ |
| (52) | (II) | ⌬-N(C₂H₅)₂ | ⌬-N(C₂H₅)₂ | ⌬-Cl | CH₃ | cyclopentene | ClO₄ |

-continued

| | | | | | | |
|---|---|---|---|---|---|---|
| (53) | (II) | 4-N(C₂H₅)₂-C₆H₄ | 4-Cl,2-Cl-C₆H₃ | 4-N(C₂H₅)₂-C₆H₄ | 2,4-Cl₂-C₆H₃ | H | 1-methyl-1-(methyl)cyclohex-3-enyl, ClO₄ |
| (54) | (II) | 4-N(CH₂-C₆H₅)₂-C₆H₄ | C₆H₅ | 4-N(CH₂-C₆H₅)₂-C₆H₄ | C₆H₅ | Cl | cyclopentenyl, I |
| (55) | (II) | 4-OC₂H₅-C₆H₄ | 4-N(C₂H₅)₂-C₆H₄ | 4-OC₂H₅-C₆H₄ | 4-OC₂H₅-C₆H₄ | H | cyclohexenyl, ClO₄ |
| (56) | (II) | 4-N(C₂H₅)₂-C₆H₄ | 4-N(C₂H₅)₂-C₆H₄ | C₆H₅ | C₆H₅ | Br | cyclohexenyl, I |
| (57) | (II) | 4-[N(C(CH₃)₃)₂]-C₆H₄ | 4-[N(C(CH₃)₃)₂]-C₆H₄ | 4-[N(C(CH₃)₃)₂]-C₆H₄ | 4-[N(C(CH₃)₃)₂]-C₆H₄ | H | cyclohexenyl, ClO₄ / cyclopentenyl, ClO₄ |
| (58) | (II) | 4-N(CH₃)₂-C₆H₄ | 4-C(CH₃)₃-C₆H₄ | 4-N(CH₃)₂-C₆H₄ | 4-C(CH₃)₃-C₆H₄ | Cl | 1,1-dimethylcyclohex-3-enyl, BF₄ |
| (59) | (II) | 4-N(C₂H₅)₂-C₆H₄ | 4-NO₂-C₆H₄ | 4-N(C₂H₅)₂-C₆H₄ | 4-NO₂-C₆H₄ | Br | indenyl, 4-CH₃-C₆H₄-SO₃ |
| (60) | (II) | 4-OC₂H₅-C₆H₄ | 4-OC₂H₅-C₆H₄ | 4-OC₂H₅-C₆H₄ | 4-OC₂H₅-C₆H₄ | Cl | 1,1-dimethylcyclohex-3-enyl, BF₄ |
| (61) | (II) | 4-N(CH₃)₂-C₆H₄ | 4-Cl-C₆H₄ | 4-Cl-C₆H₄ | 4-Cl-C₆H₄ | H | cyclohexenyl, ClO₄ |
| (62) | (II) | 4-N(C₂H₅)₂-C₆H₄ | 2-furyl | 4-N(C₂H₅)₂-C₆H₄ | 2-furyl | H | 1,1-dimethylcyclohex-3-enyl, ClO₄ |
| (63) | (II) | 4-N(CH₃)₂-C₆H₄ | 4-N(CH₃)₂-C₆H₄ | 4-Cl-C₆H₄ | 4-Cl-C₆H₄ | | |

-continued

| Compound No. | Formula | A | B | D | E | R₁ | R₂ | R₃ | R₄ | Z | m | n |
|---|---|---|---|---|---|---|---|---|---|---|---|---|
| (64) | (II) | $C_6H_4$-$N(C_2H_5)_2$ | furan(O) | $C_6H_4$-$N(C_2H_5)_2$ | furan(O) | Cl | cyclopentadienyl | | | $ClO_4$ | | |
| (65) | (III) | $C_6H_4$-$N(CH_3)_2$ | phenyl | $C_6H_4$-$N(CH_3)_2$ | phenyl | H | H | H | H | $Z_1$ | 1 | 1 |
| (66) | (III) | phenyl | H | phenyl | H | $CH_3$ | H | H | $CH_3$ | $Z_2$ | 2 | 2 |
| (67) | (III) | $C_6H_4$-$N(CH_3)_2$ | $C_6H_4$-$N(CH_3)_2$ | $C_6H_4$-$N(CH_3)_2$ | $C_6H_4$-$N(CH_3)_2$ | — | — | — | $CH_3$ | $Z_1$ | 0 | 0 |
| (68) | (III) | $C_6H_4$-$N(CH_3)_2$ | $C_6H_4$-$N(CH_3)_2$ | $C_6H_4$-$N(CH_3)_2$ | $C_6H_4$-$N(CH_3)_2$ | H | H | H | H | $Z_1$ | 1 | 1 |
| (69) | (III) | $C_6H_4$-$N(CH_3)_2$ | $C_6H_4$-$N(CH_3)_2$ | $C_6H_4$-$N(CH_3)_2$ | $C_6H_4$-$N(CH_3)_2$ | H | $CH_3$ | $CH_3$ | H | $Z_2$ | 2 | 2 |
| (70) | (III) | $C_6H_4$-$N(CH_3)_2$ | $C_6H_4$-$N(CH_3)_2$ | $C_6H_4$-$N(CH_3)_2$ | phenyl | — | — | — | — | $Z_1$ | 0 | 0 |
| (71) | (III) | $C_6H_4$-$N(CH_3)_2$ | $C_6H_4$-$CH_3$ | $C_6H_4$-$N(CH_3)_2$ | $C_6H_4$-$CH_3$ | H | H | H | H | $Z_2$ | 1 | 1 |
| (72) | (III) | $C_6H_4$-$N(CH_3)_2$ | $C_6H_4$-$OC_2H_5$ | $C_6H_4$-$N(CH_3)_2$ | $C_6H_4$-$OC_2H_5$ | — | — | — | — | $Z_2$ | 0 | 0 |
| (73) | (III) | $C_6H_4$-$N(CH_3)_2$ | $C_6H_4$-Cl | $C_6H_4$-$N(CH_3)_2$ | $C_6H_4$-Cl | $CH_3$ | H | H | $CH_3$ | $Z_1$ | 1 | 1 |
| (74) | (III) | $C_6H_4$-$N(C_2H_5)_2$ | $C_6H_4$-$N(C_2H_5)_2$ | $C_6H_4$-$N(C_2H_5)_2$ | $C_6H_4$-$N(C_2H_5)_2$ | — | — | — | — | $Z_1$ | 0 | 0 |
| (75) | (III) | $C_6H_4$-$N(C_2H_5)_2$ | $C_6H_4$-$N(C_2H_5)_2$ | $C_6H_4$-$N(C_2H_5)_2$ | $C_6H_4$-$N(C_2H_5)_2$ | H | H | H | H | $Z_2$ | 1 | 1 |

-continued

| # | | | | | | | | | |
|---|---|---|---|---|---|---|---|---|---|
| (76) | (III) | ![p-N(C2H5)2-phenyl] N(C2H5)2 | ![p-N(C2H5)2-phenyl] N(C2H5)2 | H | H | H | H | $Z_1$ | 2 2 |
| (77) | (III) | ![p-N(C2H5)2-phenyl] N(C2H5)2 | ![p-N(C2H5)2-phenyl] N(C2H5)2 | ![phenyl] | ![phenyl] | H | H | $Z_1$ | 1 1 |
| (78) | (III) | ![p-N(C2H5)2-phenyl] N(C2H5)2 | ![p-N(C2H5)2-phenyl] N(C2H5)2 | ![p-C2H5-phenyl] | ![p-OC2H5-phenyl] | — | — | $Z_2$ | 0 0 |
| (79) | (III) | ![p-N(C2H5)2-phenyl] N(C2H5)2 | ![p-N(C2H5)2-phenyl] N(C2H5)2 | ![3-CH3-4-CH3-phenyl] | ![3-CH3-4-CH3-phenyl] | CH$_3$ | CH$_3$ | $Z_1$ | 1 1 |
| (80) | (III) | ![p-N(C2H5)2-phenyl] N(C2H5)2 | ![p-N(C2H5)2-phenyl] N(C2H5)2 | ![p-OC2H5-phenyl] | ![p-OC2H5-phenyl] | H | H | $Z_1$ | 1 1 |
| (81) | (III) | ![p-N(C2H5)2-phenyl] N(C2H5)2 | ![p-N(C2H5)2-phenyl] N(C2H5)2 | ![3-OCH3-4-OCH3-phenyl] | ![3-OCH3-4-OCH3-phenyl] | — | — | $Z_2$ | 0 0 |
| (82) | (III) | ![p-N(C2H5)2-phenyl] N(C2H5)2 | ![p-N(C2H5)2-phenyl] N(C2H5)2 | ![pyridyl-CH3] | ![pyridyl-CH3] | H | H | $Z_1$ | 1 1 |
| (83) | (III) | ![p-N(C2H5)2-phenyl] N(C2H5)2 | ![p-N(C2H5)2-phenyl] N(C2H5)2 | ![p-Cl-phenyl] | ![p-Cl-phenyl] | H | H | $Z_1$ | 1 1 |
| (84) | (III) | ![p-N(C2H5)2-phenyl] N(C2H5)2 | ![p-N(C2H5)2-phenyl] N(C2H5)2 | ![3-Cl-4-Cl-phenyl] | ![3-Cl-4-Cl-phenyl] | Cl | Cl | $Z_1$ | 0 0 |
| (85) | (III) | ![p-N(C2H5)2-phenyl] N(C2H5)2 | ![p-N(C2H5)2-phenyl] N(C2H5)2 | — | — | — | — | $Z_2$ | 1 1 |
| (86) | (III) | ![p-N(CH2-phenyl)2-phenyl] N(CH2-φ)$_2$ | ![p-N(CH2-phenyl)2-phenyl] N(CH2-φ)$_2$ | ![phenyl] | ![phenyl] | H | H | $Z_1$ | 1 1 |
| (87) | (III) | ![p-N(C2H5)2-phenyl] N(C2H5)2 | ![p-OC2H5-phenyl] OC$_2$H$_5$ | ![p-OC2H5-phenyl] | ![p-OC2H5-phenyl] | CH$_3$ | CH$_3$ | $Z_1$ | 2 2 |

-continued

| No. | Formula | Ar₁ | Ar₂ | Ar₃ | Ar₄ | R₁ | R₂ | R₃ | R₄ | Z | n |
|---|---|---|---|---|---|---|---|---|---|---|---|
| (88) | (III) | –C₆H₄–N(C₂H₅)₂ | –C₆H₄–N[C(CH₃)₃]₂ | –C₆H₄–N(C₂H₅)₂ | –C₆H₄–N(C₂H₅)₂ | — | — | — | — | $Z_1$ | 0 |
| (89) | (III) | –C₆H₄–N[C(CH₃)₃]₂ | –C₆H₄–N[C(CH₃)₃]₂ | –C₆H₄–N[C(CH₃)₃]₂ | –C₆H₄–N[C(CH₃)₃]₂ | H | H | H | H | $Z_2$ | 1 |
| (90) | (III) | –C₆H₄–N(CH₃)₂ | –C₆H₄–C(CH₃)₃ | –C₆H₄–N(CH₃)₂ | –C₆H₄–C(CH₃)₃ | — | — | — | — | $Z_1$ | 0 |
| (91) | (III) | –C₆H₄–N(C₂H₅)₂ | –C₆H₄–NO₂ | –C₆H₄–N(CH₃)₂ | –C₆H₄–NO₂ | CH₃ | H | H | CH₃ | $Z_1$ | 1 |
| (92) | (III) | –C₆H₄–OC₂H₅ | –C₆H₄–OC₂H₅ | –C₆H₄–OC₂H₅ | –C₆H₄–OC₂H₅ | H | H | H | H | $Z_2$ | 1 |
| (93) | (III) | –C₆H₄–N(CH₃)₂ | –C₆H₄–Cl | –C₆H₄–N(CH₃)₂ | –C₆H₄–Cl | — | — | — | — | $Z_1$ | 0 |
| (94) | (III) | –C₆H₄–N(C₂H₅)₂ | (furyl) | –C₆H₄–N(C₂H₅)₂ | (furyl) | H | H | H | H | $Z_1$ | 1 |
| (95) | (III) | –C₆H₄–N(C₃H₇)₂ | –C₆H₄–N(C₃H₇)₂ | –C₆H₄–N(C₃H₇)₂ | –C₆H₄–N(C₃H₇)₂ | H | H | H | H | $Z_1$ | 1 |
| (96) | (III) | –C₆H₄–N(C₁₀H₂₁)₂ | –C₆H₄–N(C₁₀H₂₁)₂ | –C₆H₅ | –C₆H₅ | — | — | — | — | $Z_2$ | 0 |

The optical recording medium of the present invention can have the construction, for example, as shown in FIG. 1. The optical recording medium shown in FIG. 1 can be formed by providing an organic thin film 2 containing the compound selected from the compounds represented respectively by the above Formulas (I), (II) and (III), on a substrate 1.

In forming the organic thin film 2, the compounds represented respectively by the above Formulas (I), (II) and (III) can be used in combination of two or more kinds. At this time, the compounds to be used in combination may be the compounds having the same structure or compounds having different structure, and also may be mixed and dispersed with other dyes, for example, dyes of polymethine type, azulene type, pyrylium type, squarium type, croconium type, triphenylmethane type, xanthene type, anthraquinone type, cyanine type, phthalocyanine type, dioxazine type, tetrahydrocholine type, triphenothiazine type, phenanthlene type, metal chelate complex type, aminium salt type or diimonium salt type other than the compounds represented respectively by the above Formulas (I), (II) and (III), or with metals, metallic compounds or the like, for example, Al, Te, Bi, Sn, In, Se, SnO, $TeO_2$, As, Cd, etc. Alternatively, the organio thin film 2 and a layer containing the dye other than the compounds of Formulas (I), (II), and (III), the metal or metallic compound may be laminated each other.

The compound selected from the compounds represented respectively by the above Formulas (I), (II) and (III) may also be contained in a binder in a dispersed state or dissolved state. Such a binder may include, for example, cellulose esters such as nitrocellulose, cellulose phosphate, cellulose sulfate, cellulose acetate, cellulose propionate, cellulose butyrate, cellulose myristate, cellulose palmitate, cellulose acetate propionate and cellulose acetate butyrate, cellulose ethers such as methyl cellulose, ethyl cellulose, propyl cellulose and butyl cellulose; vinyl resins such as polystyrene, polyvinyl chloride, polyvinyl acetate, polyvinyl butyral, polyvinyl acetal, polyvinyl alcohol and polyvinyl pyrrolidone: copolymer resins such as a styrene/butadiene copolymer, a styrene/acrylonitrile copolymer, a styrene/butadiene/acrylonitrile copolymer and a vinyl chloride/vinyl acetate copolymer, acrylic resins such as polymethyl methacrylate, polymethyl acrylate, polybutyl acrylate, polyacrylic acid, polymethacrylic acid, polyacrylamide and polyacrylonitrile, polyesters such as polyethylene terephthalate; polyacrylate resins such a poly(4,4'-isopropylidenediphenylene-co- 1,4-cyclohexylenedimethylene carbonate), poly(ethylenedioxy-3,3'-phenylene thiocarbonate), poly(4,4'-isopropylidenediphenylene carbonate coterephthalate), poly(4,4'-isopropylidenediphenylene carbonate), poly(4,4'-sec butylidenediphenylene carbonate) and poly(4,4'-isopropylidenediphenylene carbonate block oxyethylene), or polyamides, polyimides, epoxy resins, phenol resins, polyolefins such as polyethylene. polypropylene and chlorinated polyethylene, etc.

The organic thin layer 2 may also contain a surface active agent, an antistatic agent, a stabilizer, a dispersant, a flame retardant, a lubricant, a plasticizer, etc.

The organic thin film 2 can be formed by the vapor deposition, coating, spraying method or the like. However, it can be formed preferably by the coating method in view of the operation.

As an organic solvent that can be used when the organic thin film 2 is provided by coating, though variable depending on whether the above compounds are used in a dispersed state or a dissolved state, there can be used, in general, alcohols such as methanol. ethanol, isopropanol and diacetone alcohol; ketones such as acetone, methyl ethyl ketone and cyclohexanone; amides such as N,N -dimethylformamide; and N,N-dimethylacetamide; sulfoxides such as dimethylsulfoxide; ethers such as tetrahydrofuran, dioxane, and ethylene glycol monomethyl ether; esters such as methyl acetate, ethyl acetate and butyl acetate; aliphatic halogenated hydrocarbon such as chloroform, methylene chloride, dichloroethylene. carbon tetrachloride and trichloroethylene; aromatics such as benzene, toluene, xylene, monochlorobenzene and dichlorobenzene or aliphatic hydrocarbons such as n-hexane, cyclohexane and ligroin; etc.

The coating can be carried out by using coating methods such as dip coating, spray coating, spinner coating, beat coating, Meyer bar coating. blade coating, roller coating and curtain coating.

The organic thin film 2 may appropriately have a dry thickness or vapor deposited thickness of from 50 Å to 100 μm, preferably from 200 Å to μm.

The substrate I may be made of materials having a high transmittance to light used in instances in which recording and/or reproducing light is irradiated on the side of this substrate 1, and there can be used acrylic resins, polyester resins, polycarbonate resins, vinyl type resins, polysulfon resins, polyimide resins, polyacetal resins, polyolefin resins, polyamide resins, cellulose derivatives, etc. In instances in which recording and/or reproducing light is irradiated on the reverse side to the substrate 1, there may be used, in addition to the above, polyvinyl chloride, fluorine-substituted ethylene polymers, a vinyl chloride/vinyl acetate copolymer, polyvinylidene chloride, acrylic polymers such as polymethyl methacrylate, polystyrene, polyvinyl butyral, acetyl cellulose, a styrene/butadiene copolymer, polyethylene, polypropylene, polycarbonate, an epoxyacrylonitrile/butadiene/styrene copolymer, etc.

In some instances, it is possible to use various kinds or types depending on purposes, such as metallic sheets made of iron, stainless steel, aluminum, tin, copper, zinc, etc., synthetic paper, paper, fiber reinforced plastics, composite materials of metallic powder such as magnetic materials with plastics, and ceramics.

Figure 2:
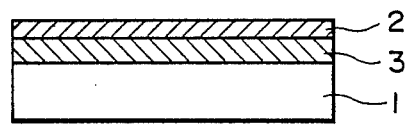
Figure 3:
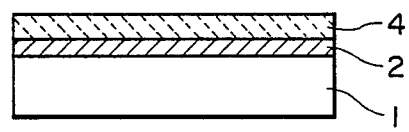
Figure 4:
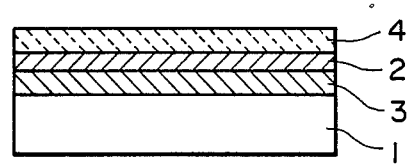

The present invention can also be made to have the construction that a subbing layer 3 and/or a protective layer 4 is/are provided as shown in FIG. 2 to FIG. 4.

The subbing layer is provided for the purpose of (a) improving the adhesion, (b) providing a barrier to water, gas, or the like, (c) improving the storage stability of the recording layers, (d) improving the reflectance, (e) protecting the substrates from solvents, (f) forming pregrooves; etc. With regard to the purpose (a), there can be used polymeric materials, for example, a variety of materials such as ionomer resins, polyamide resins, vinyl type resins, natural macromolecules, silicone and liquid rubber. With regard to the purposes (b) and (c), there can be used, in addition to the above polymeric materials, inorganic compounds, for example, $SiO_2$, $MgF_2$, SiO, $TiO_2$, ZnO, TiN, SiN, etc., metals or semimetals for example, Zn, Cu, S, Ni, Cr, Ge. Se, Cd, Ag, Al, etc. With regard to the purpose (d), there can be used metals, for example, Al, Ag. etc., or organic thin film of, for example, azulene dyes, methine dyes, etc. having a metallic gloss. And, with regard to the purposes (e) and (f), there can be used ultraviolet curing resins, thermosetting resins, thermoplastic resins, etc. The subbing layer may appropriately have a film thickness of from 50 Å to 100 μm, preferably from 200 Å to 30 μm.

The protective layer is provided for the purposes of protection from scratch, dust, soil, etc., improving the storage stability of the recording layers and improving the reflectance, and the materials that can be used therefor are the materials same as those for the subbing layer. The protective layer may appropriately have a film thickness of 50 Å or more, preferably 200 Å or more.

In this occasion, the above compounds represented by the above Formulas (I), (II) or (III) of the present invention may be contained in the subbing layer and/or the protective layer. The subbing layer and/or the protective layer may also contain stabilizers, flame retardants, lubricants, antistatic agents, surface active agents, plasticizers, etc.

In another constitution of the optical recording medium according to the present invention, the optical recording medium may have the so called air-sandwiched construction such that two pieces of the optical recording mediums of the constitution as shown in FIG. 1 to FIG. 4, or one piece of such optical recording medium and one piece consisting of the substrate only, are hermetically stuck together, with the interposition of spacers and with the organic thin film 2 facing inwardly.

There is no particular limitation in the shape of the optical recording medium according to the present invention, and there may be included, for example, disc- or card-like ones.

In the present invention, it is possible to carry out the recording on the organic film by irradiation with a gas laser beam such as an argon laser beam (oscillation wavelength: 488 nm), a helium/neon laser beam (oscillation wavelength: 633 nm), a helium/cadmium laser beam (oscillation wavelength: 442 nm), etc, but more suitable is a method in which the recording is carried out by irradiation with a laser beam preferably having an oscillation wavelength of 750 nm or more, inparticular, a laser beam having the oscillation wavelength at the near infrared or infrared region, such as a gallium/aluminum/arsenic semiconductor laser beam (oscillation wavelength: 830 nm).

The writing can also be performed with a good sensitivity even by irradiation from a semiconductor laser that oscillates light of the visible light region.

In the optical recording medium according to the present invention, the irradiation, for example, of the light as mentioned above causes changes in shape of the recording layer at the irradiated parts by fusion or sublimation, and thus the pits are formed.

For carrying out the reading, the above laser beams can also be used. Here, the writing and reading can be carried out with use of laser beams having the same wavelength, or can be carried out with use of laser beams having the different wavelength.

The optical recording medium and the process for preparing the same can bring about the effect as follows:

(1) The organic film has greater absorption bands at a long wavelength region such as the near infrared region and at a visible light region, and can achieve recording in a high sensitivity with use of semiconductor lasers or the like.
(2) Pits with good shape can be formed, and a high C/N ratio can be obtained.
(3) There can be achieved a high stability to heat and light, excellent storage stability, and less reproduction deterioration to be caused by reproducing light.

EXAMPLES

The present invention will be described below in greater detail in line with Examples, but the present invention is by no means limited to these.

EXAMPLE 1

On a polymethyl methacrylate (hereinafter referred to as "PMMA") substrate of 130 mm in diameter and 1.2 mm in thickness, a pregroove of 50 μm in thickness was provided by use of an epoxy/acrylate type ultraviolet curing resin and according to the 2P process (a photopolymer process), and a solution obtained by dissolving 2 parts by weight of the compound of Compound No. (16) listed above in 98 parts by weight of dichloroethane was coated thereon according to spinner coating, followed by drying to obtain an organic thin filmy recording layer of 800 Å.

The optical recording medium thus prepared was fitted on a turn table, and the turn table was rotated at 1,800 rpm with a motor. Information was written in the organic thin filmy recording layer from the substrate side by use of a semiconductor laser of an oscillation wavelength of 830 nm and with a spot size of 1.5 μm in diameter, recording power of 6 mW and recording frequency of 2 MHz, and reproduced with a read-out power of 1.0 mW. The thus reproduced wave form was subjected to spectrum analysis (a scanning filter; band width: 30 kHz) to measure the C/N ratio (carrier/noise ratio).

Next, in regard to the same recording medium, measured under the above measurement conditions was the C/N ratio after the recorded part was repeatedly read out $10^5$ times.

Further measured were transmittance (830 nm measurement) and C/N ratio after a same recording medium prepared under the above conditions was left to stand for 2,000 hours under the conditions of 60° C. and 95% RH to carry out an environmental storage stability test. Also measured were transmittance (830 nm measurement) and C/N ratio after xenon lamp light of 1,000 W/m$^2$ (300 to 900 nm) was irradiated on the same recording medium for 70 hours to carry out a light-resisting stability test.

EXAMPLES 2 TO 27

Example 1 was repeated to prepare optical recording mediums of Examples 2 to 27, except that the compound No. (16) used in Example 1 was replaced by the above compound No. (3), (4), (11), (14), (20), (22), (24), (29), (42), (35), (36), (39), (41), (44), (48), (53), (58), (77), (67), (70), (71), (74), (81), (85), (87) and (89), respectively.

The every sort of test was carried out on the above optical recording mediums of Examples 2 to 27 in the same manner as in Example 1.

EXAMPLES 28 AND 29

The compound No. (97) shown below and the above compound No. (10) were mixed in dichloroethane in weight ratio of 1:1, and the resulting mixture was used to provide an organic thin filmy recording layer of 850 Å in dried thickness in the same manner as in Example 1 to prepare an optical recording medium of Example 28. Also prepared was a optical recording medium of Example 29 in the same manner as in Example 28 but using the compound No. (98) shown below in place of the compound No. (97) used in Example 28. On the optical recording mediums of Examples 28 and 29 thus obtained, the every sort of test was carried out in the same manner as in Example 1.

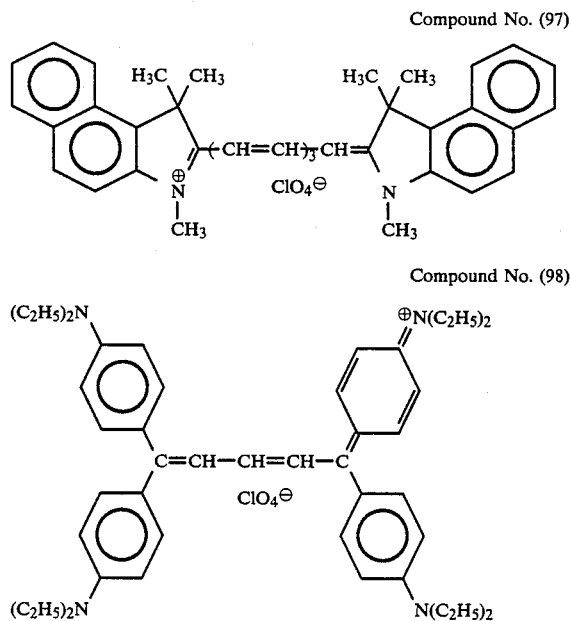

Compound No. (97)

Compound No. (98)

EXAMPLES 30 and 31

Optical recording mediums of Examples 30 and 31 were prepared in the same manner as in Examples 28 and 29 but using the compound No. (43) in place of the compound No. (10) used in the above Examples 28 and 29. On the optical recording mediums of Examples 30 and 31 thus obtained, the every sort of test was carried out in the same manner as in Example 1.

EXAMPLES 32 AND 33

Optical recording mediums of Examples 32 and 33 were prepared in the same manner as in Examples 28 and 29 but using the compound No. (75) in place of the compound No. (10) used in the above Examples 28 and 29. On the optical recording mediums of Examples 32 and 33 thus obtained, the every sort of test was carried out in the same manner as in Example 1.

EXAMPLE 34

A solution obtained by mixing 2 parts by weight of the compound of Compound No. (9) previously shown and 1 part by weight of nitrocellulose resin (OH-less Lacquer; available from Daisel Ltd.) in 97 parts by weight of methyl ethyl ketone was coated according to the spinner coating method on a PMMA substrate of 130 mm in diameter and 1.2 mm in thickness provided with a pregroove, to prepare an organic thin filmy recording layer of 1,000 Å in dried thickness.

The every sort of test was carried out on the resulting optical recording medium of Example 34 in the same manner as in Example 1.

EXAMPLES 35 to 46

Optical recording mediums were prepared in the same manner as in Example 12 but replacing the compound No. (9) used in Example 34 above by the compounds Nos. (6), (18), (25), (49), (37), (47), (61), (83), (68), (78) and (88), respectively, to prepare optical recording mediums of Examples 35 to 45.

On the optical recording mediums of Examples 35 to 45 above thus obtained, the every sort of test was carried out in the same manner as in Example 1.

EXAMPLES 46 AND 47

In a molybdenum boat 500 mg of the compounds of Compounds Nos. (1) and (19) previously shown were introduced and, after evacuation to $1 \times 10^{-6}$ mmHg or less, vapor deposition was carried out on PMMA substrates of 130 mm in diameter and 1.2 mm in thickness provided with a pregroove. While controlling the pressure in the vacuum chamber with use of a heater so as not to increase to $10^{-5}$ more during the vapor deposition, organic thin filmy recording layers of 950 Å were formed to prepare optical recording mediums of Examples 46 and 47, respectively.

On the optical recording medium of Examples 46 and 47 thus obtained, the every sort of test was carried out in the same manner as in Example 1.

EXAMPLES 48 AND 49

Example 46 was repeated but using the compound No. (33) in place of the compound No. (1) used in Example 46 above, to prepare an optical recording medium of Example 48.

Example 46 was also repeated but using the compound No. (38) in place of the compound No. (19) used in Example 47 above, to prepare an optical recording medium of Example 49. On the optical recording medium of Example 49 thus obtained, the every sort of test was carried out in the same manner as in Example 1.

EXAMPLES 50 AND 51

Example 46 was repeated but using the compound No. (65) in place of the compound No. (1) used in Example 46 above, to prepare an optical recording medium of Example 50.

Example 46 was also repeated but using the compound No. (77) in place of the compound No. (19) used in Example 47 above, to prepare an optical recording medium of Example 51. On the optical recording medium of Example 51 thus obtained, the every sort of test was carried out in the same manner as in Example 1.

Results of the above are shown in Table 1.

TABLE 1

| Example No. | Compound No. | Initial stage X (%) | Initial stage Y (dB) | Repeated reproduction $10^5$ times Y (dB) | Environmental storage stability 60° C., 95% RH, after 2,000 hours X (%) | Environmental storage stability 60° C., 95% RH, after 2,000 hours Y (dB) | Light-resisting stability: xenon lamp 1,000 W/m² after 70 hr X (%) | Light-resisting stability: xenon lamp 1,000 W/m² after 70 hr Y (dB) |
|---|---|---|---|---|---|---|---|---|
| 1 | (16) | 25 | 50 | 47 | 27 | 48 | 29 | 45 |
| 2 | (3) | 24 | 48 | 45 | 27 | 46 | 30 | 42 |
| 3 | (4) | 24 | 52 | 49 | 26 | 49 | 28 | 46 |

TABLE 1-continued

| Example No. | Compound No. | Initial stage X (%) | Initial stage Y (dB) | Repeated reproduction 10⁵ times Y (dB) | Environmental storage stability 60° C., 95% RH, after 2,000 hours X (%) | Environmental storage stability 60° C., 95% RH, after 2,000 hours Y (dB) | Light-resisting stability: xenon lamp 1,000 W/m² after 70 hr X (%) | Light-resisting stability: xenon lamp 1,000 W/m² after 70 hr Y (dB) |
|---|---|---|---|---|---|---|---|---|
| 4 | (11) | 23 | 52 | 48 | 27 | 48 | 29 | 45 |
| 5 | (14) | 25 | 50 | 46 | 29 | 47 | 30 | 41 |
| 6 | (20) | 25 | 49 | 45 | 29 | 45 | 32 | 40 |
| 7 | (22) | 24 | 50 | 47 | 26 | 47 | 29 | 44 |
| 8 | (24) | 26 | 47 | 42 | 29 | 40 | 33 | 38 |
| 9 | (29) | 23 | 51 | 47 | 26 | 48 | 28 | 45 |
| 10 | (42) | 15 | 55 | 50 | 20 | 51 | 24 | 46 |
| 11 | (35) | 12 | 56 | 51 | 16 | 51 | 20 | 47 |
| 12 | (36) | 14 | 54 | 50 | 19 | 49 | 22 | 46 |
| 13 | (39) | 18 | 52 | 49 | 21 | 46 | 24 | 44 |
| 14 | (41) | 12 | 57 | 53 | 18 | 51 | 21 | 50 |
| 15 | (44) | 15 | 54 | 51 | 19 | 51 | 22 | 46 |
| 16 | (48) | 16 | 53 | 49 | 20 | 50 | 23 | 47 |
| 17 | (53) | 21 | 50 | 47 | 24 | 48 | 28 | 42 |
| 18 | (58) | 17 | 51 | 48 | 21 | 49 | 25 | 45 |
| 19 | (77) | 21 | 55 | 50 | 23 | 54 | 29 | 47 |
| 20 | (67) | 19 | 53 | 48 | 23 | 50 | 25 | 45 |
| 21 | (70) | 19 | 54 | 48 | 24 | 51 | 26 | 48 |
| 22 | (71) | 23 | 49 | 42 | 27 | 42 | 29 | 40 |
| 23 | (74) | 18 | 56 | 53 | 21 | 54 | 23 | 51 |
| 24 | (81) | 21 | 52 | 50 | 24 | 50 | 26 | 48 |
| 25 | (85) | 20 | 55 | 52 | 21 | 53 | 25 | 50 |
| 26 | (87) | 20 | 53 | 51 | 23 | 51 | 26 | 48 |
| 27 | (89) | 24 | 50 | 48 | 25 | 46 | 29 | 45 |
| 28 | (10) / (97) | 22 | 54 | 50 | 26 | 45 | 29 | 42 |
| 29 | (10) / (98) | 17 | 57 | 53 | 20 | 52 | 25 | 49 |
| 30 | (43) / (97) | 20 | 51 | 47 | 25 | 47 | 28 | 43 |
| 31 | (43) / (98) | 15 | 56 | 52 | 18 | 51 | 21 | 49 |
| 32 | (75) / (97) | 21 | 52 | 49 | 24 | 48 | 27 | 45 |
| 33 | (75) / (98) | 18 | 56 | 54 | 20 | 54 | 22 | 51 |
| 34 | (9) | 24 | 53 | 50 | 26 | 48 | 29 | 44 |
| 35 | (6) | 22 | 52 | 48 | 27 | 46 | 30 | 42 |
| 36 | (18) | 26 | 48 | 44 | 29 | 43 | 31 | 40 |
| 37 | (25) | 25 | 50 | 45 | 27 | 45 | 33 | 42 |
| 38 | (49) | 16 | 53 | 50 | 19 | 49 | 23 | 46 |
| 39 | (37) | 15 | 54 | 52 | 19 | 50 | 21 | 48 |
| 40 | (47) | 12 | 57 | 51 | 16 | 52 | 19 | 49 |
| 41 | (68) | 13 | 55 | 53 | 17 | 51 | 21 | 48 |
| 42 | (83) | 22 | 55 | 51 | 25 | 52 | 27 | 50 |
| 43 | (68) | 23 | 52 | 49 | 25 | 50 | 26 | 48 |
| 44 | (78) | 21 | 53 | 51 | 26 | 49 | 26 | 48 |
| 45 | (88) | 22 | 51 | 47 | 27 | 49 | 27 | 46 |
| 46 | (1) | 25 | 50 | 46 | 27 | 48 | 29 | 44 |
| 47 | (19) | 22 | 52 | 49 | 25 | 50 | 29 | 45 |
| 48 | (33) | 21 | 49 | 47 | 24 | 48 | 28 | 44 |
| 49 | (38) | 19 | 51 | 48 | 22 | 49 | 25 | 46 |
| 50 | (65) | 25 | 50 | 47 | 28 | 48 | 29 | 45 |
| 51 | (77) | 22 | 54 | 50 | 26 | 51 | 28 | 48 |

X: Transmittance
Y: C/N ratio

EXAMPLE 52

On a polycarbonate (hereinafter referred to as "PC") substrate of 0.4 mm in thickness and of Wallet size, a pregroove was provided by hot pressing, and coated thereon by bar coating was a solution obtained by mixing 4 parts by weight of the compound of Compound No. (21) previously shown in 96 parts by weight of diacetone alcohol, followed by drying to obtain an organic thin filmy recording layer of 1,000 Å. Further provided thereon in close contact by a heated roll process through an ethylene-vinyl acetate dry film was a PC substrate of 0.3 mm in thickness and of wallet size to prepare an optical recording medium of Example 52 of close contact structure.

The optical recording medium of Example 52 thus prepared was fitted on a stage that drives in the direction of X - Y, and information was written in the organic thin filmy recording layer in the direction of Y, using a semiconductor laser of an oscillation wavelength of 830 nm, from the side of the PC substrate of 0.4 mm thick, and with a spot size of 3.0 μm in diameter, recording power of 4.0 mW and recording pulse of 80 μsec, which information was reproduced with a read out power of 0.4 mW, to measure the ratio of the contrast thus formed (A—B)/A; A=signal intensity at a non-recorded portion, B=signal intensity at a recorded portion.

The environmental storage stability test and light-resisting stability test were also carried out on this optical recording medium in the same manner as in Example 1, and thereafter the transmittance and contrast ratio were measured.

EXAMPLE 53

Example 52 was repeated but using the compound No. (48) in place of the compound No. (21) used in Example 52 above, to prepare an optical recording medium. On the optical recording medium of Example 53 thus obtained, the every sort of test was carried out in the same manner as in Example 52.

EXAMPLE 54

Example 52 was repeated but using the abovementioned compound No. (89) in place of the compound No. (21) used in Example 52 above, to prepare an optical recording medium. On the optical recording medium of Example 54 thus obtained, the every sort of test was carried out in the same manner as in Example 52.

Results of the above are shown in Table 2.

TABLE 2

| Example No. | Compound No. | Initial stage X (%) | Y' | Evironmental storage stability: 60° C., 95% RH, after 2,000 hours X (%) | Y' | Light-resisting stability: xenon lamp, 1,000 W/m² after 70 hr X (%) | Y' |
|---|---|---|---|---|---|---|---|
| 52 | (21) | 20 | 0.70 | 23 | 0.66 | 28 | 0.59 |
| 53 | (48) | 21 | 0.70 | 23 | 0.68 | 28 | 0.60 |
| 54 | (89) | 17 | 0.72 | 20 | 0.70 | 25 | 0.65 |

X: Transmittance
Y': Contrast ratio

COMPARATIVE EXAMPLE 1

Using as a comparative example a mixture obtained by mixing only the compound No. (97) used in Example 28 in dichloroethane, an organic thin filmy recording layer of 850 Å in dried thickness was provided in the same manner as in Example 1 to prepare an optical recording medium of Comparative Example 1.

On the optical recording medium of Comparative Example 1 thus obtained, the every sort of test was carried out in the same manner as in Example 1. Results obtained are shown in Table 3.

TABLE 3

| Compound No. | Initial stage X (%) | Y (dB) | Repeated reproduction 10⁵ times Y (dB) | Environmental storage stability 60° C., 95% RH, after 2,000 hours X (%) | Y (dB) | Light-resisting stability: xenon lamp 1,000 W/m² after 70 hr X (%) | Y (dB) |
|---|---|---|---|---|---|---|---|
| Comparative example: 1 (97) | 21 | 47 | 41 | 35 | 36 | 41 | 32 |

X: Transmittance
Y: C/N ratio

What is claimed is:

1. An optical recording medium comprising a substrate supporting an organic film, wherein said organic film includes a polymethine compound represented by

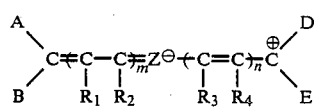

wherein A, B, D and E each represent a hydrogen atom, a substituted or unsubstituted alkyl group, a cyclic alkyl group, an alkenyl group, substituted or unsubstituted aryl group, a substituted or unsubstituted styryl group, a substituted unsubstituted heterocyclic group: $R_1$, $R_2$, $R_3$, and $R_4$ each representing a hydrogen atom, a halogen atom, or an alkyl group; m and n each represents an integer of 1, 1 or 2; and $Z^-$ represents

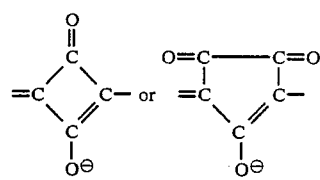

2. The optical recording medium of claim 1, wherein said organic film has a thickness of from 50Å to 100 μm.

3. The optical recording medium of claim 1, wherein said optical recording medium, performs recording by the formation of pits by virtue of changes in shape of the recording layer.

* * * * *

UNITED STATES PATENT AND TRADEMARK OFFICE
CERTIFICATE OF CORRECTION

PATENT NO. : 4,944,981

DATED : July 31, 1990

INVENTOR(S) : YOSHIHIRO OGUCHI ET AL.

It is certified that error appears in the above-identified patent and that said Letters Patent is hereby corrected as shown below: Title page:

AT [56] REFERENCES CITED

U.S. Patent Documents, "4,738,909  4/1988  Oguchi et al." should read --4,738,908  4/1988  Oguchi et al.--.

Foreign Patent Documents, "61162385  9/1988  Japan." should read --61-162385  7/1986  Japan.--.

COLUMN 1

Line 22, "recorded" should read --recorded.--.
Line 43, "40479/1871," should read --40479/1981,--.
Line 50, "205841/1988," should read --205841/1985,--.
Line 61, "has" should read --have--.

COLUMN 2

Line 18, "at repre-" should read --at least one compound selected from the compounds repre---.

Line 51, " 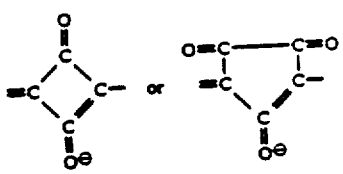 " should read

-- 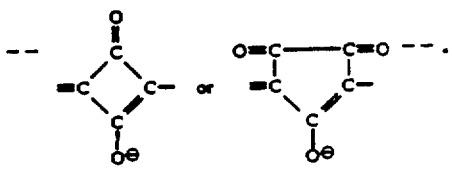 --.

UNITED STATES PATENT AND TRADEMARK OFFICE
CERTIFICATE OF CORRECTION

PATENT NO. : 4,944,981

DATED : July 31, 1990

INVENTOR(S) : YOSHIHIRO OGUCHI, ET AL.

Page 2 of 5

It is certified that error appears in the above-identified patent and that said Letters Patent is hereby corrected as shown below:

COLUMN 3

Line 15, "n" should read --n---.
Line 19, "t-octylgroup," should read --t-octyl group--.
Line 36, "o" should be deleted.

COLUMN 16

Compound 60, "  " should read --  --.

COLUMNS 17-18

Compounds 65-75, "$\underline{Z}$" should read --$\underline{Y}$--.

| $\underline{Z}_1$ | $\underline{Y}_1$ |
|---|---|
| $Z_2$ | $Y_2$ |
| $Z_1$ | $Y_1$ |
| $Z_1$ | $Y_1$ |
| $Z_2$ | $Y_2$ |
| $Z_1$ | $Y_1$ |
| $Z_2$ | $Y_2$ |
| $Z_2$ | $Y_2$ |
| $Z_1$ | $Y_1$ |
| $Z_1$ | $Y_1$ |
| $Z_2$ | $Y_2$ |

UNITED STATES PATENT AND TRADEMARK OFFICE
CERTIFICATE OF CORRECTION

PATENT NO. : 4,944,981
DATED : July 31, 1990
INVENTOR(S) : YOSHIHIRO OGUCHI ET AL.

It is certified that error appears in the above-identified patent and that said Letters Patent is hereby corrected as shown below:

COLUMN 19

Compound 78, "—⟨O⟩—OC₂H₅" should read -- —⟨O⟩—C₂H₅ --.

COLUMN 19-20

Compounds 76-87, "$Z_1$" should read --$Y_1$--.

| | |
|---|---|
| $Z_1$ | $Y_1$ |
| $Z_2$ | $Y_2$ |
| $Z_1$ | $Y_1$ |
| $Z_1$ | $Y_1$ |
| $Z_2$ | $Y_2$ |
| $Z_1$ | $Y_1$ |
| $Z_1$ | $Y_1$ |
| $Z_1$ | $Y_1$ |
| $Z_2$ | $Y_2$ |
| $Z_2$ | $Y_2$ |
| $Z_1$ | $Y_1$ |

COLUMNS 21-22

Compounds 88-96, "$Z_1$" should read --$Y_1$--.

| | |
|---|---|
| $Z_1$ | $Y_1$ |
| $Z_2$ | $Y_2$ |
| $Z_1$ | $Y_1$ |
| $Z_1$ | $Y_1$ |
| $Z_2$ | $Y_2$ |
| $Z_1$ | $Y_1$ |
| $Z_1$ | $Y_1$ |
| $Z_1$ | $Y_1$ |
| $Z_2$ | $Y_2$ |

UNITED STATES PATENT AND TRADEMARK OFFICE
CERTIFICATE OF CORRECTION

PATENT NO. : 4,944,981

DATED : July 31, 1990

INVENTOR(S) : YOSHIHIRO OGUCHI ET AL.

It is certified that error appears in the above-identified patent and that said Letters Patent is hereby corrected as shown below:

COLUMN 23

Line 25, "organio thin film 2" should read --organic thin film 2--.
Line 27, "compound" should read --compounds-- and "laminated" should read --laminated to--.
Line 50, "a" should read --as--.
Line 53, "carbonate coterephthalate)," should read --carbonate-co-terephthalate),--.
Line 56, "carbonate block oxy-" should read --carbonate-block-oxy---.

COLUMN 24

Line 11, "hydrocarbon" should read --hydrocarbons--.
Line 19, "Meyer bar coating." should read --Meyer bar coating,--.
Line 23, "μm." should read --1μm.--.

COLUMN 25

Line 41, "inparticu-" should read --in particu---.

COLUMN 28

Line 26, "$10^{-5}$ more" should read --$10^{-5}$mmHg or more--.

UNITED STATES PATENT AND TRADEMARK OFFICE
CERTIFICATE OF CORRECTION

PATENT NO. : 4,944,981

DATED : July 31, 1990

INVENTOR(S) : YOSHIHIRO OGUCHI ET AL.

It is certified that error appears in the above-identified patent and that said Letters Patent is hereby corrected as shown below:

COLUMN 32

Line 40, "substituted unsubstituted" should read --substituted or unsubstituted--.
Line 41, "represent-" should read --represents--.
Line 42, "ing" should be deleted.
Line 52, insert, --said optical recording medium being sensitive to light in the range of near infrared light from conventional semiconductor lasers to light of the visible light region near 680 nm.--.

Signed and Sealed this

Twenty-first Day of July, 1992

Attest:

DOUGLAS B. COMER

Attesting Officer    Acting Commissioner of Patents and Trademarks